Figure 1:
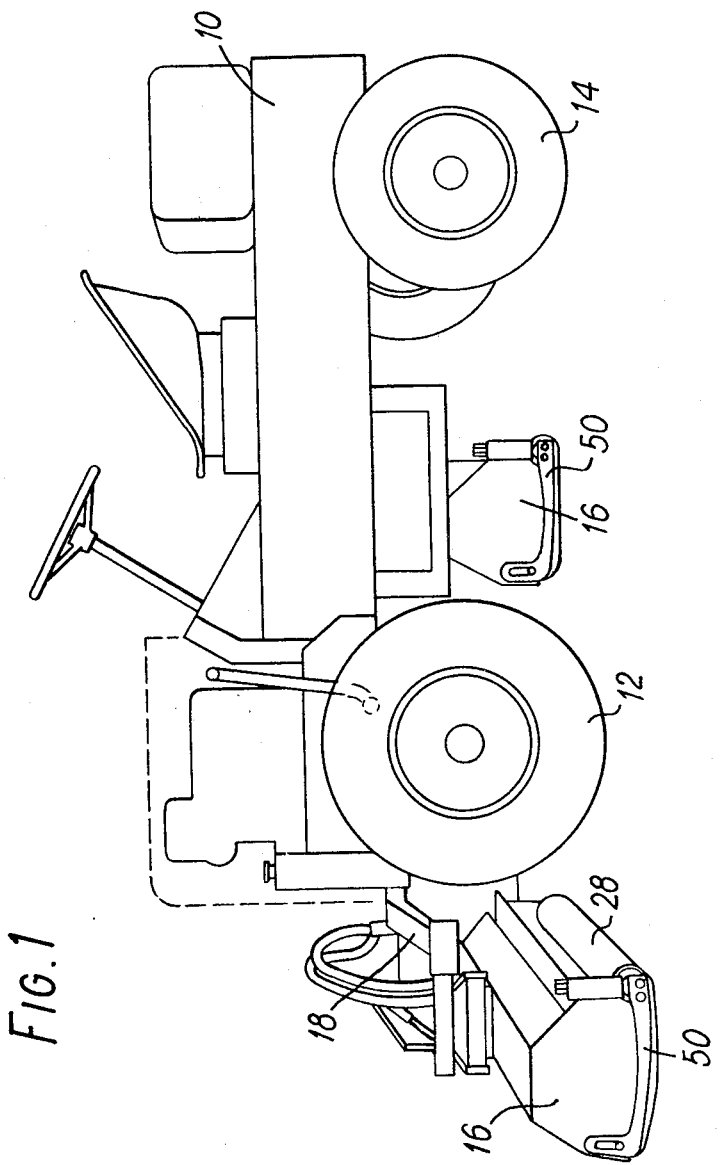

United States Patent [19]
Aldred et al.

[11] 3,918,239
[45] Nov. 11, 1975

[54] LAWN MOWERS

[75] Inventors: Edward John Aldred; Julian Kowalski, both of Ipswich, England

[73] Assignee: Ransomes Sims & Jefferies Limited, Ipswich, England

[22] Filed: Mar. 20, 1974

[21] Appl. No.: 453,095

[30] Foreign Application Priority Data
Mar. 28, 1973  United Kingdom............... 14909/73

[52] U.S. Cl. .......................... 56/7; 56/17.2; 56/249
[51] Int. Cl.² ............................................ A01D 35/24
[58] Field of Search.......................... 56/7, 17.2, 249

[56] References Cited
UNITED STATES PATENTS

| | | | |
|---|---|---|---|
| 2,674,837 | 4/1954 | Buck | 56/249 X |
| 3,099,124 | 7/1963 | Strasel | 56/17.2 X |
| 3,599,406 | 8/1971 | Akgulian et al. | 56/17.2 |

Primary Examiner—J. N. Eskovitz
Attorney, Agent, or Firm—Burgess Ryan and Wayne

[57] ABSTRACT

A lawn mower of the kind having reel-type cutting units each supported by its connection to the frame of the mower and by a ground-engaging element positioned to the rear of the bottom cutting blade of unit and each provided with means for adjusting the vertical position of the ground-engaging element relative to the bottom blade to vary the height of cut of the unit. Each cutting unit is provided with side skids to prevent scalping by the unit, and the vertical position of the side skids relative to the bottom blade is adjustable with the height-of-cut adjusting means to ensure the skids are always the same height above the ground.

8 Claims, 6 Drawing Figures

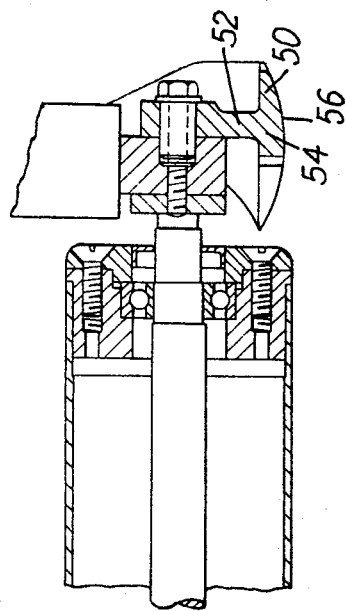
FIG.4
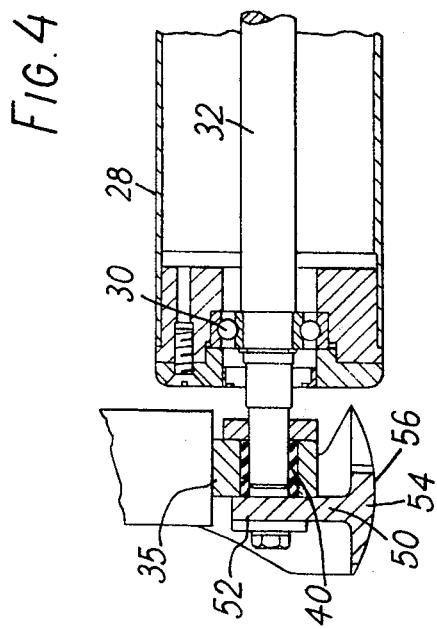
FIG.5
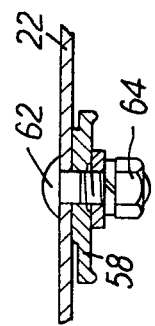
FIG.6
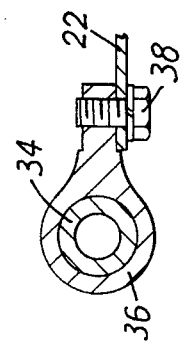

LAWN MOWERS

This invention relates to lawn mowers.

More particularly, the invention relates to lawn mowers of the kind comprising a frame supported on ground-engaging members, and at least one cutting unit having a bottom cutting blade and a co-operating cutting cylinder, the or each cutting unit being connected to the frame so as to be movable longitudinally with the frame and being supported by its connection to the frame and by a ground-engaging element positioned to the rear of the bottom cutting blade and having height of cut adjustment means for adjusting the vertical position of the ground-engaging element relative to the bottom blade thereby to vary the height of cut of the cutting unit.

It is usual with such lawn mowers to provide on the or each cutting unit a pair of longitudinally extending skids fixed one at each side of the unit in a position vertically spaced from the ground-engaging element so as, in use, to engage the ground and raise the cutting unit if the unit encounters steeply rising ground, thereby to prevent scalping of the ground by the bottom blade.

A disadvantage of such known lawn mowers is that adjustment of the height of cut also varies the height above level ground of the skids, so that the skids are not equally effective for different settings of the height of cut.

According to this invention there is provided a lawn mower of the kind set forth, in which the or each cutting unit is provided with a pair of longitudinally extending skids mounted one at each side of the cutting unit, and means for adjusting the position of the skids relative to the bottom blade thereby in use to keep constant the height of the skids above level ground for different settings of the height of cut adjustment means.

Preferably, the height of cut adjustment means of the or each cutting unit is adapted simultaneously to adjust the position of the skids relative to the bottom blade.

Figure 2:
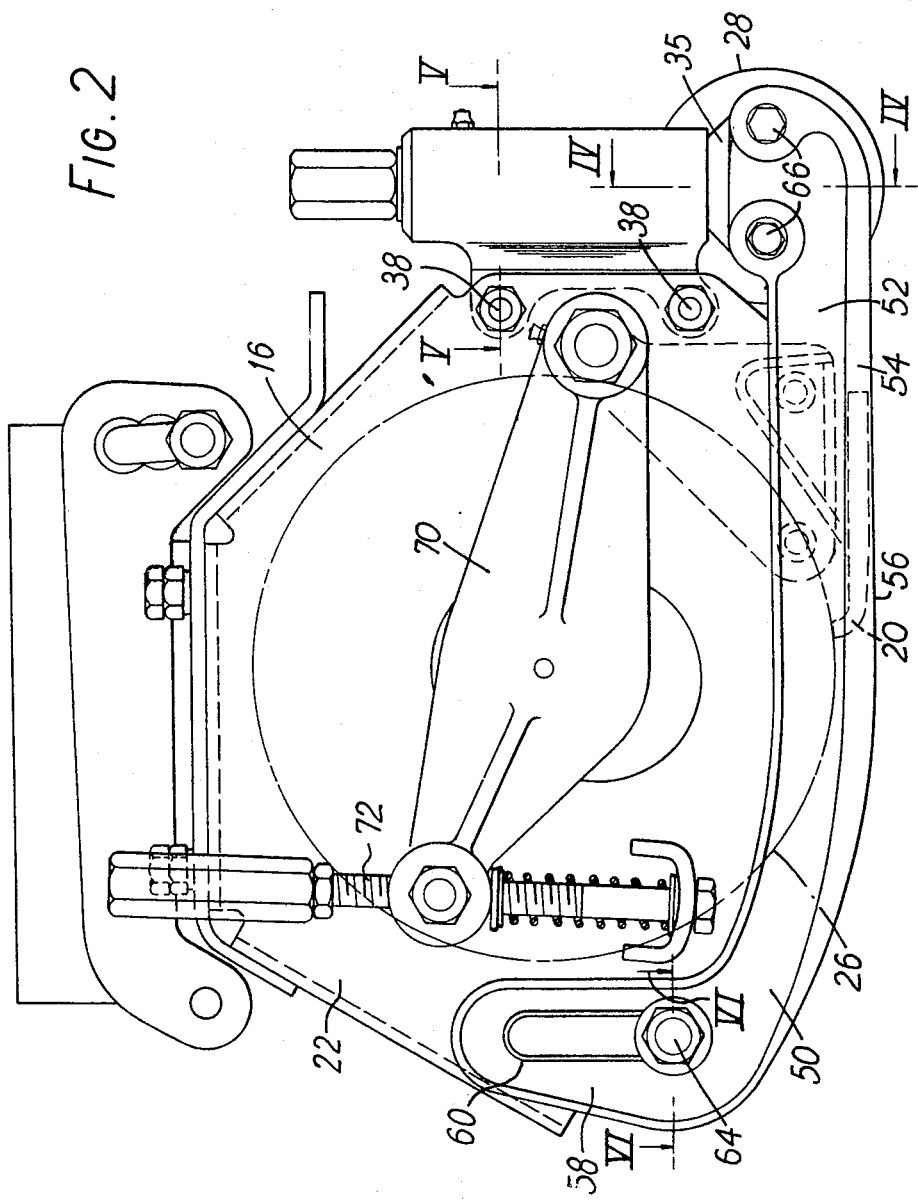
Figure 3:
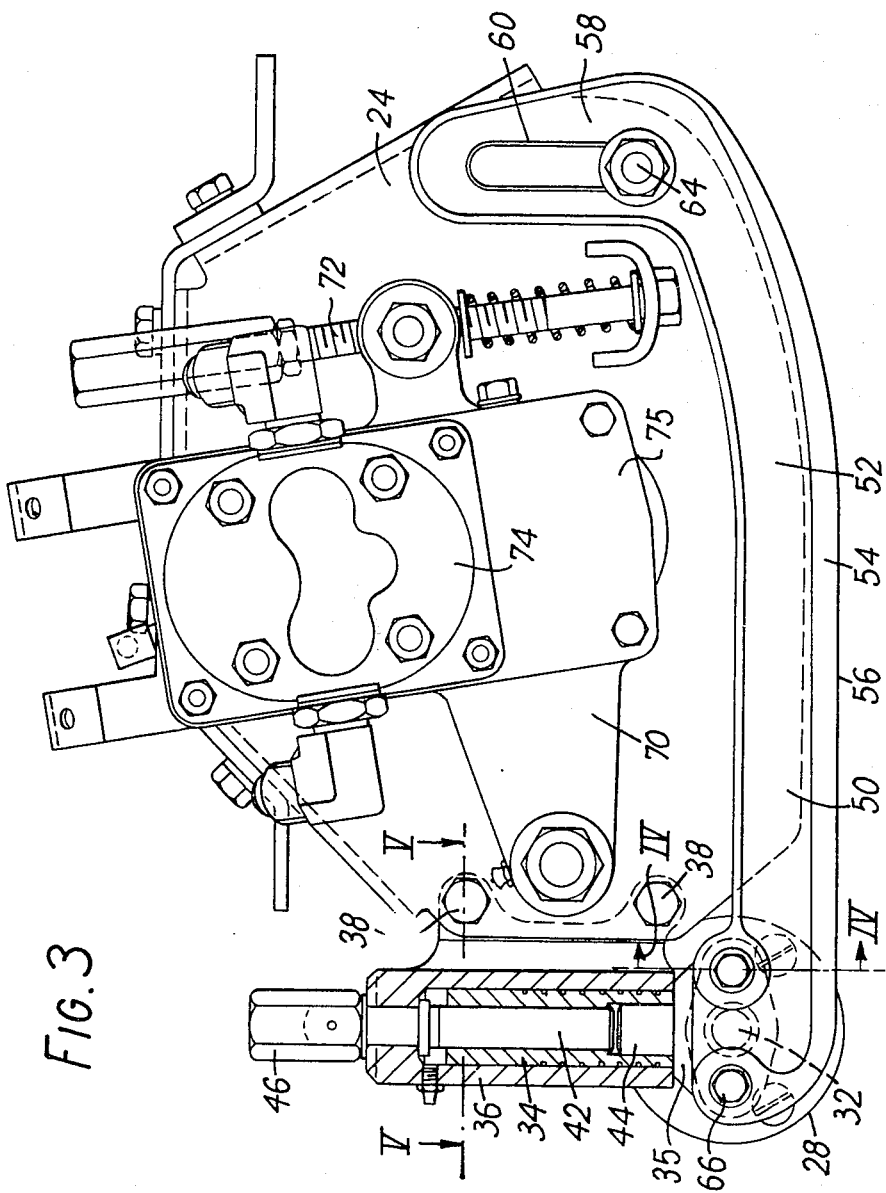

The invention will now be described, by way of example, with reference to the accompanying drawings, in which:

FIG. 1 is a diagrammatic side view of a gang mower constructed in accordance with the invention, FIG. 2 is a side elevation of a cutting unit of the mower of FIG. 1, FIG. 3 is a side elevation of the cutting unit, looking in a direction opposite to that of FIG. 2, FIG. 4 is a section on line IV—IV of FIG. 3, FIG. 5 is a section on line V—V of FIG. 3, and FIG. 6 is a section on line VI—VI of FIG. 2.

Referring to the drawings, there is provided a gang mower having a frame 10 supported on a pair of traction wheels 12 and a pair of steerable wheels 14, and a number of cutting units 16 each carried by a support arm 18 pivotally mounted on the frame. The support arms and their connection to the cutting units are similar to those described in British Patent Specification Nos. 989,914 and 1,093,251.

As shown in FIGS. 2 to 4, each cutting unit has a bottom blade 20 supported between side plates 22 and 24 of the unit and a rotatable cutting cylinder 26 co-operating with the bottom blade 20, and is supported, in operation, by the support arm 18 and by a horizontal roller 28 positioned to the rear of the bottom blade 20. The cutting cylinder 26 is supported in known manner between bearings carried by levers 70 pivoted to side plates 22 and 24 rotatable by adjusting mechanisms 72 to adjust the gap between cylinder 26 and bottom blade 20. The cylinder 26 is driven by a hydraulic motor 74 and gear box 75 mounted on one of the levers 70.

The roller 28 is mounted, through bearings 30 on an axle 32. Axle 32 is secured at each end to the lower end of a cylindrical plunger 34 slidable vertically in a sleeve 36 fixed by bolts 38 to the adjacent side plate 22 or 24 of the cutting unit, each end of the axle 32 being held in a rubber bush 40 fitted into a bore in a flat lower portion 35 of the plunger 34. Each plunger 34 is movable by means of an adjusting screw 42 engaging a threaded bore 44 in the plunger 34 so that rotation of the screw 42 moves the plunger 34 relative to the sleeve 36. Rotation of the two screws 42, by means of nuts 46 fixed to the upper ends of the screws, thus alters the position of the roller 28 relative to the bottom blade 20 and therefore adjusts the height of cut of the cutting unit.

Each cutting unit 16 is provided with a pair of elongated skids 50, one at each side of the unit. Each skid 50 consists of a vertical plate 52 formed at its lower edge with a flange 54 having a lower face 56 which is convex in transverse cross-section. The lower face 56 extends horizontally for a distance from the rear end of the skid and then curves upwardly towards the forward end of the skid, the width of the face tapering towards the forward end. At its forward end, the vertical plate 52 of the skid has an upwardly extending portion 58 which is formed with a vertically elongated slot 60. A clamping bolt 62 (FIG. 6) extends through a hole in the adjacent side plate 22 or 24 and through the slot 60, and receives a clamping nut 64. At its rear end, each skid 50 is secured by bolts 66 to the lower end of the adjacent plunger 34 supporting the roller axle 32.

Each skid 50 is so positioned that, in use of the mower 10 on level ground, the horizontal part of the lower face 56 of the skid is a short distance from the ground. If the cutting unit encounters steeply rising ground, one or both of the skids 50 will come into contact with the ground, and will lift the cutting unit 16, so preventing scalping by the unit. To alter the height of cut of the cutting unit 16, the clamping nuts 64 at the forward ends of the skids 50 are slackened, and the adjusting screws 42 are rotated to move the plungers 34 carrying the roller axle 32. This adjusts the position relative to the bottom blade 20 of both the roller 28 and the two skids 50, the skids remaining in their horizontal orientation. When the adjustment is complete, the clamping nuts 64 are tightened again, to hold the skids securely in position. The skids 50 are thus automatically positioned at the optimum height relative to the roller 28, whatever the height of cut of the cutting unit.

The rubber bushes 40 between the ends of roller axle 32 and plungers 34 allows some degree of independent movement of the plungers, to prevent stress on the plungers or roller axle if the two plungers are not moved precisely together during adjustment of the height of cut.

It will be appreciated that various modifications could be made in the described embodiment. The skids could be mounted on the cutting unit so that their height was adjustable independently of the height of cut adjustment.

We claim:

1. A lawn mower comprising a frame supported on ground-engaging members, and at least one cutting unit having a bottom cutting blade and a co-operating cutting cylinder, said at least one cutting unit being connected to the frame so as to be movable longitudinally with the frame and being supported by its connection to the frame and by ground-engaging means positioned to the rear of the bottom cutting blade and having height of cut adjustment means for adjusting the vertical position of the ground-engaging means relative to the bottom blade thereby to vary the height of cut of the cutting unit, in which said at least one cutting unit is provided with a pair of longitudinally extending skids mounted one at each side of the cutting unit, and means for adjusting the vertical position of the skids relative to the bottom blade while maintaining constant the angular orientation of each skid relative to the cutting unit, thereby in use to keep constant the height of the skids above level ground for different settings of the height of cut adjustment means.

2. A lawn mower as claimed in claim 1, in which the height of cut adjustment means of said at least one cutting unit is adapted simultaneously to adjust the position of the skids relative to the bottom blade.

3. A lawn mower as claimed in claim 2, in which the ground engaging means is a ground-engaging element supported between two mounting members whose position relative to the bottom blade is adjustable by adjustment of the height of cut adjusting means, and each skid is rigidly fixed to one of the mounting members.

4. A lawn mower as claimed in claim 3, in which each skid is rigidly fixed at its rear end to one of the mounting members and at its forward end is provided with clamping means for clamping the forward end of the skid to a frame member of the at least one cutting unit, the clamping means being releasable to allow movement of the forward end of the skid relative to the at least one cutting unit on adjustment of the height of cut adjustment means.

5. A lawn mower as claimed in claim 4, in which the clamping means comprises a vertically elongated slot in an upwardly projecting element fixed to the skid, and a clamping bolt passing through the slot and through a hole in the frame members.

6. A lawn mower as claimed in claim 3, in which the height of cut adjustment means comprises two plungers each fixed at its lower end to one of the mounting members and slidable vertically in a housing fixed to the frame of the at least one cutting unit, and means for adjusting the position of each plunger in its housing.

7. A lawn mower as claimed in claim 1, in which the ground-engaging means comprises a horizontally disposed roller.

8. A lawn mower as claimed in claim 1, in which each longitudinally extending skid has a lower face, the lowermost portion of which extends horizontally when the mower stands on level ground.

* * * * *